United States Patent [19]

Nishio et al.

[11] Patent Number: 4,726,150
[45] Date of Patent: Feb. 23, 1988

[54] FACE GRINDER

[75] Inventors: Kiyoshi Nishio, Toyonaka; Arihisa Tanaka, Tokyo, both of Japan

[73] Assignees: Asahi Diamond Industrial Co., Ltd., Tokyo; Nissei Industrial Co., Ltd., Osaka, both of Japan

[21] Appl. No.: 786,847

[22] Filed: Oct. 11, 1985

[30] Foreign Application Priority Data

Oct. 15, 1984 [JP] Japan ................................. 59-215337
Oct. 15, 1985 [JP] Japan ................................. 59-215336

[51] Int. Cl.⁴ .............................................. B24B 7/04
[52] U.S. Cl. .................................... 51/120; 51/237 M
[58] Field of Search ................. 51/120, 133, 134, 119, 51/237 M, 118, 131.3, 131.4, 132

[56] References Cited

U.S. PATENT DOCUMENTS 2,275,061  3/1942  Indge ..................................... 51/120
3,172,241  3/1965  Habenicht ............................ 51/120

FOREIGN PATENT DOCUMENTS 0798004  5/1936  France ................................... 51/120

Primary Examiner—Frederick R. Schmidt
Assistant Examiner—Robert A. Rose
Attorney, Agent, or Firm—McAulay, Fields, Fisher, Goldstein & Nissen

[57] ABSTRACT

A face grinder capable of grinding the end surface of a workpiece without leaving any unground protruding portion at the center thereof by imparting rotation on its own axis and around a chuck holder or eccentric rotation to either a chuck for holding the workpiece or a cup-shaped grinding wheel by a planetary gear mechanism.

1 Claim, 12 Drawing Figures

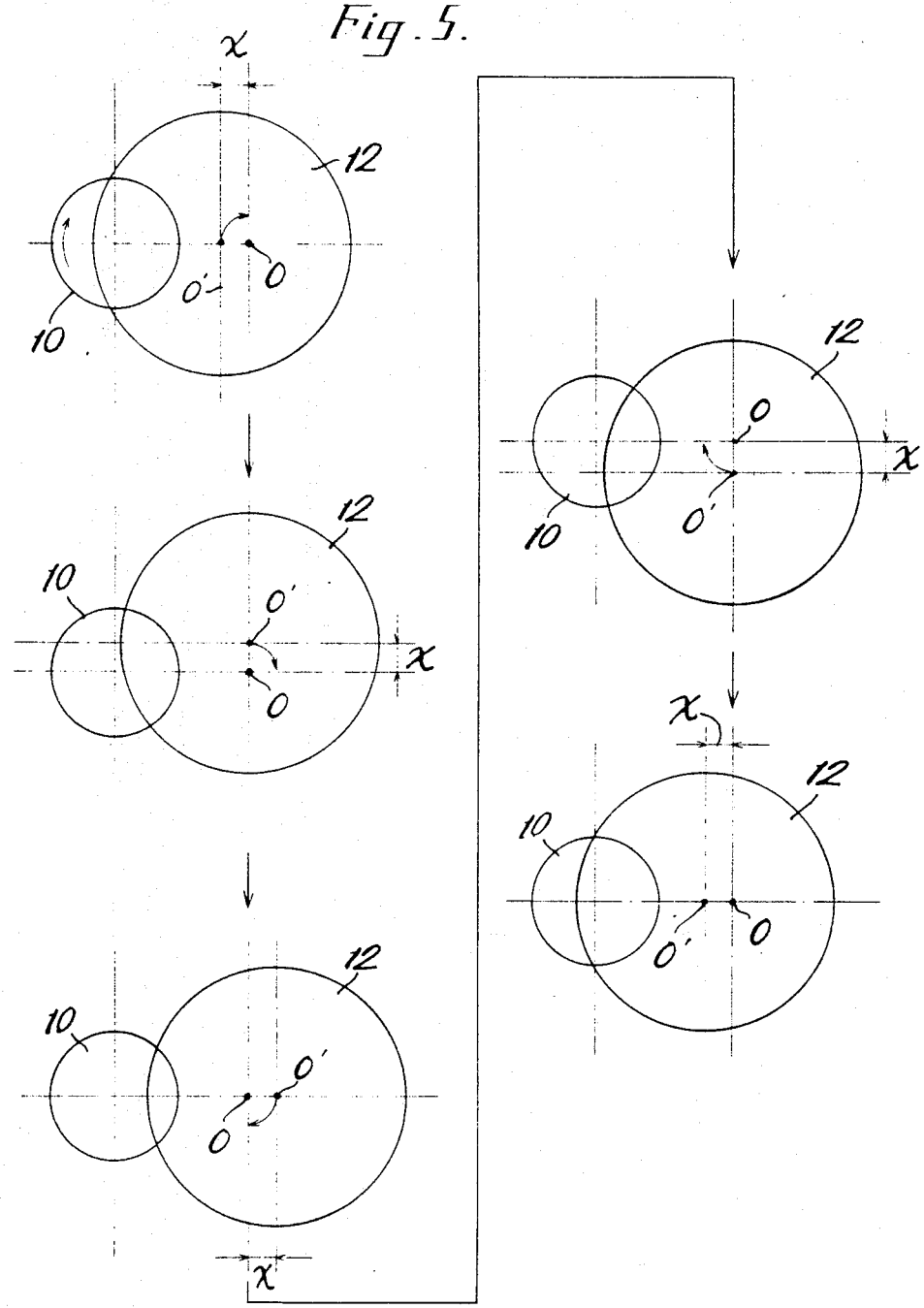

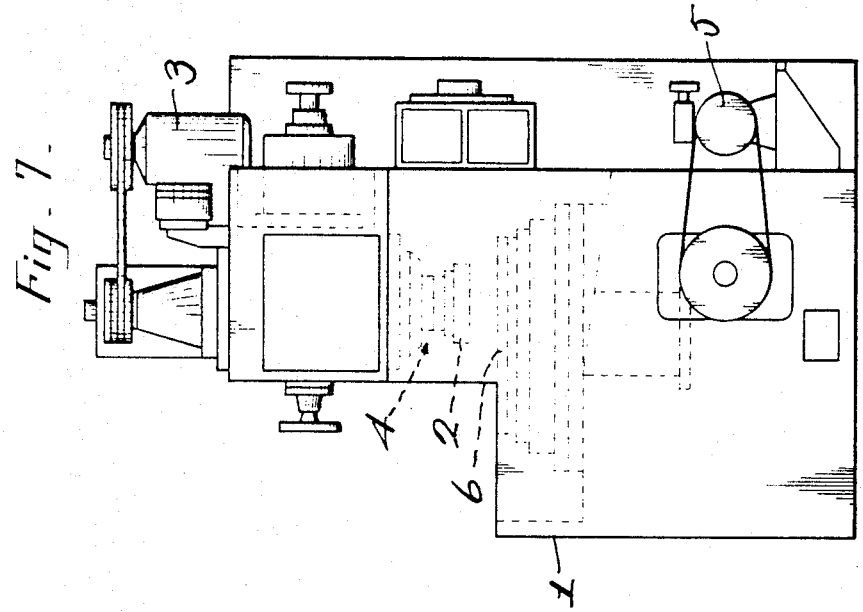
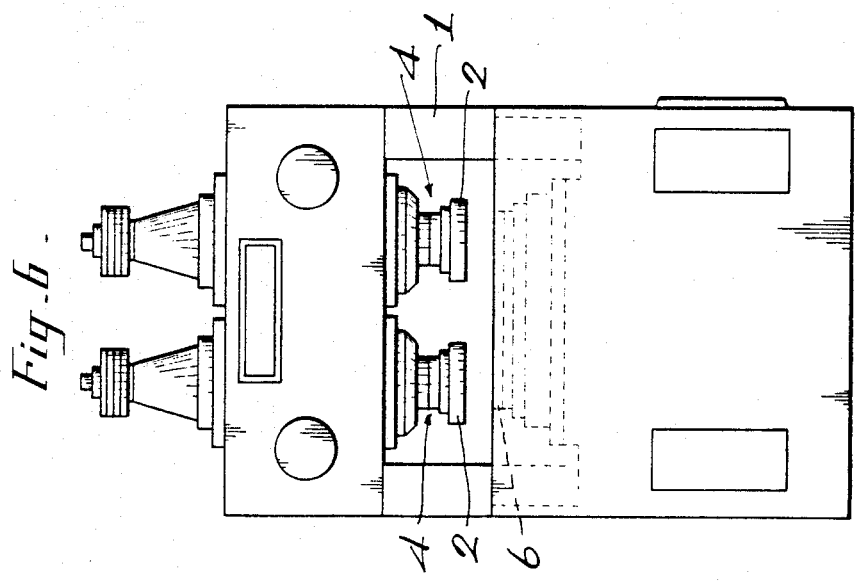

FACE GRINDER

BACKGROUND OF THE INVENTION

This invention relates to a face grinder used for grinding the end surface of, for example, a cylindrical workpiece.

A face grinder having the structure shown in FIGS. 6 to 9 is generally known.

This is composed of two wheel heads 4, one for rough grinding and the other for finishing, which are provided side by side on a bed 1 such as to be vertically movably supported thereby, a rotary index table 6 which is disposed under the wheel heads such as to face them, as shown in FIGS. 6 and 7, and a multiplicty of chucks 8 which are disposed on the index table 6, as shown in FIG. 8 and 9. The wheel heads 4 are provided with cup-shaped grinding wheels 2 which are rotated by drive motors 3. The index table 6 and the chuck 8 are rotated by a drive motor 5 and a drive motor 7, respectively. A workpiece 9 is supplied to the chuck 8 at the loading position of the index table and is held by an appropriate method. The grinding wheel 2 cuts the workpiece 9 which is being rotated together with the chuck 8, whereby the end surface of the workpiece 9 is ground to a predetermined dimension.

The end surface of the workpiece 9 which has been ground by the face grinder bears the grinding mark shown in FIG. 10 if it has a center hole 9a and the grinding mark shown in FIG. 11 if it has no center hole. Accordingly, when the wheel 2 becomes locally worn, the workpiece 9 without a center hole 9a has a protruding portion 9b left unground due to the partial wear of the wheel 2, so that the required working accuracy of the workpiece 9 is not obtained. As a result, the lift of the wheel 2 is short, thereby necessitating frequent changes of the wheel, and it is difficult to obtain good working efficiency.

SUMMARY OF THE INVENTION

Accordingly, it is an object of the present invention to provide a face grinder which never produces a protruding portion due to partial wheel wear, unlike grinders in the prior art.

To achieve this aim, a face grinder according to this invention is composed of a vertically movable wheel head which supports a cup-shaped grinding wheel, and a chuck for fixing a workpiece which is disposed such as to face the wheel head, characterized in that either the chuck or the cup-shaped wheel is connected to a drive source for imparting rotation on its own axis and around the axis of a chuck holder or the wheel head, or to a source for imparting eccentric rotation.

BRIEF DESCRIPTION OF THE DRAWINGS

FIG. 5 is an explanatory view of the trail of a workpiece;

FIG. 6 is a schematic elevational view of a conventional face grinder;

FIG. 7 is a side elevational view of the conventional face grinder shown in FIG. 6;

DETAILED DESCRIPTION OF THE PREFERRED EMBODIMENTS

Figure 1:
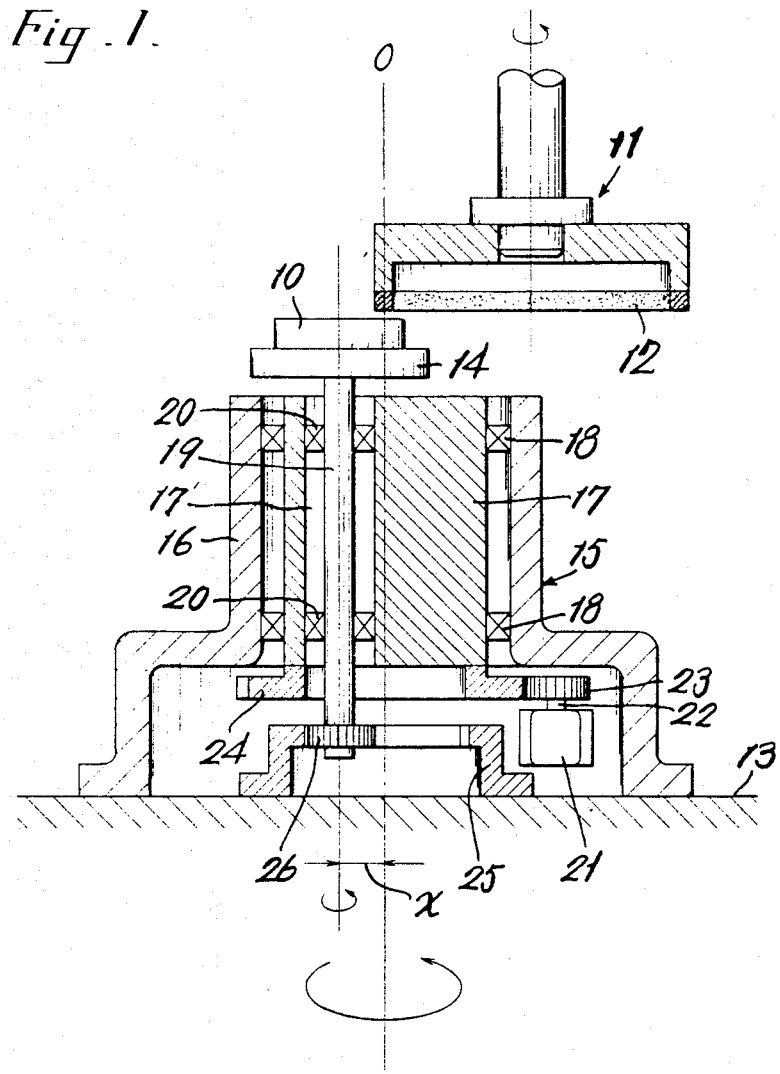
FIG. 1 is a vertical elevation view of a first embodiment of a face grinder according to the invention.
Figure 2:
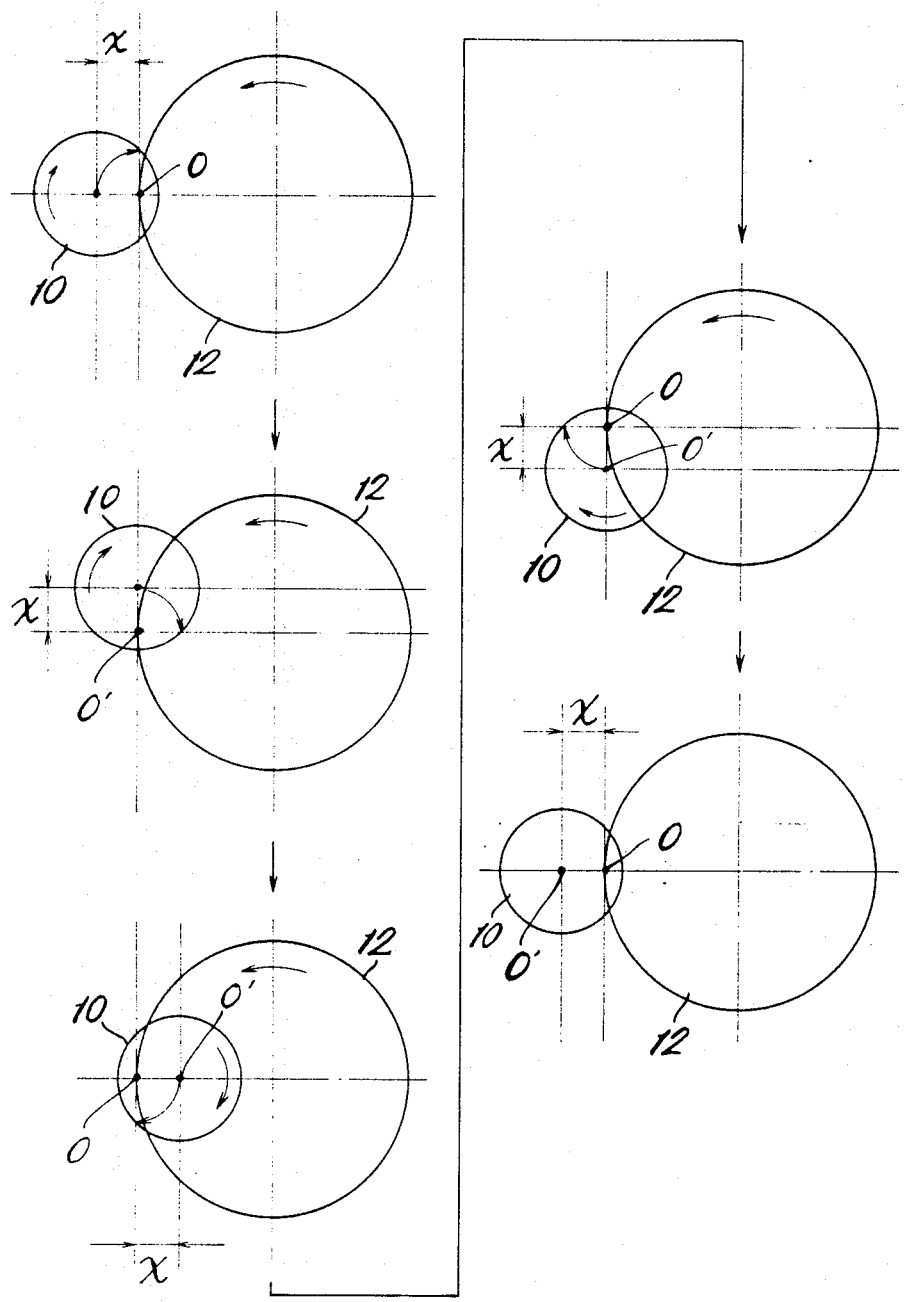
FIG. 2 is an explanatory view of the trail of a workpiece.

Referring first to FIGS. 1 and 2, a first embodiment of a face grinder according to the invention is shown. The reference number 11 denotes a wheel head which is vertically movably supported by the upper portion of a bed (not shown), and 14 a chuck for fixing a workpiece 10. A cup-shaped grinding wheel 12 which is rotated by a motor (now shown) is attached to the lower end of the wheel head 11.

An index table 13 which is disposed such as to face the lower surface of the wheel head 11 is also rotated by a motor (not shown). A multiplicity of driving devices 15 are provided on the index table 13, each of them supporting the relevant chuck 14 such that the chucks 14 rotate on their own axes and around the axis of the driving device. The driving device 15 has the following structure.

The driving device 15 is supported by a cylindrical body 16 which is fixed on the index table 13. A first spindle 17 of the driving device 15 is vertically supported by bearings 18 and a second spindle 19 is supported by bearings 20 in the bore portion 17' of the first spindle 17. The second spindle 19 is eccentric with respect to the first spindle by the necessary distance $X_1$ from the center $O_1$ of the rotation of the first spindle 17. A gear wheel 24 attached to the lower end of the first spindle 17 is meshed with a pinion 23 attached to the power shaft 22 of a motor 21 which is secured to the cylindrical body 16, and a planetary gear 26 which is secured to the lower end of the second spindle 19 is meshed with a fixed gear 25 which is fixed on the index table 13 concentrically with respect to the cylindrical body 16, thereby constituting a planetary gear mechanism.

When the motor 21 is driven, the pinion 23 is rotated and moves the first spindle 17, whereby the second spindle 19 which is provided eccentrically with the first spindle 17 rotates around the axis of the cylindrical body. when the second spindle 19 rotates around the axis of the cylindrical body 16, intermeshing of the planetary gear 26 and the fixed gear 25 causes the second spindle 19 to rotate on its own axis. Accordingly, the chuck 14 mounted on the upper end of the second spindle 19 rotates on its own axis and around the axis of the cylindrical body 16 and imparts motion caused by the planetary gear mechanism as is shown in FIG. 2 to a workpiece 10, so that the workpiece is ground without a protruding portion which is inevitable in the prior art.

Figure 3:
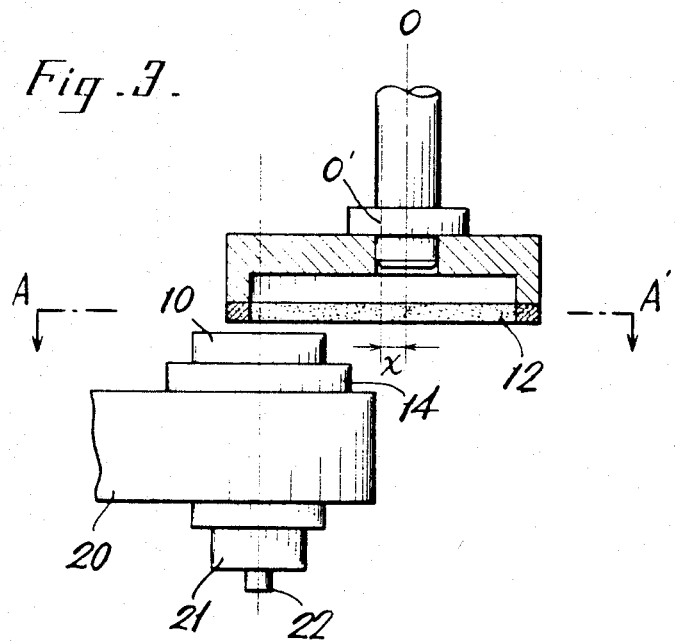
FIG. 3 is a vertical elevational view of a second embodiment of the invention.
Figure 4:
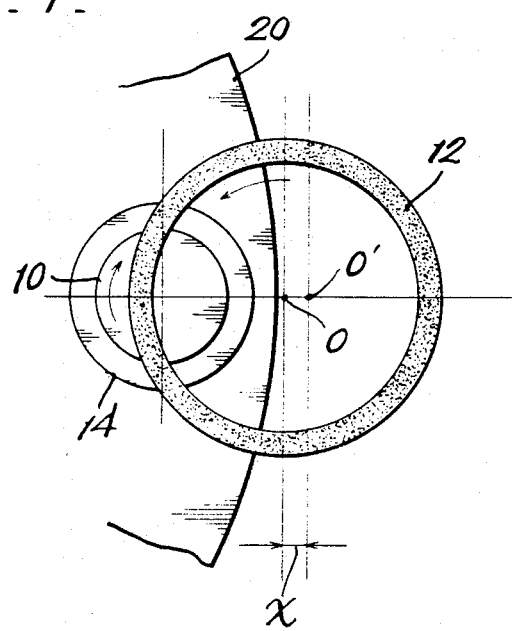
FIG. 4 is a sectional view of the embodiment shown in FIG. 3, taken along the line A—A"
Figure 8:
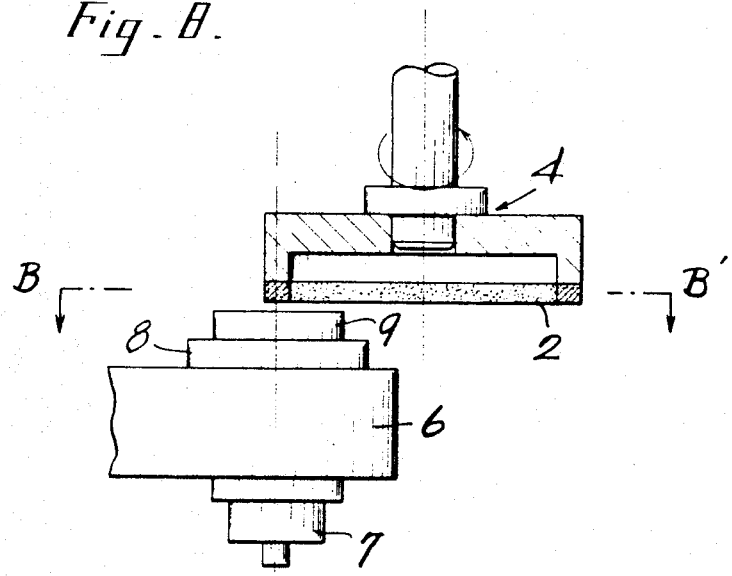
FIG. 8 is a vertical sectional view of a part of the face grinder shown in FIG. 6.
Figure 9:
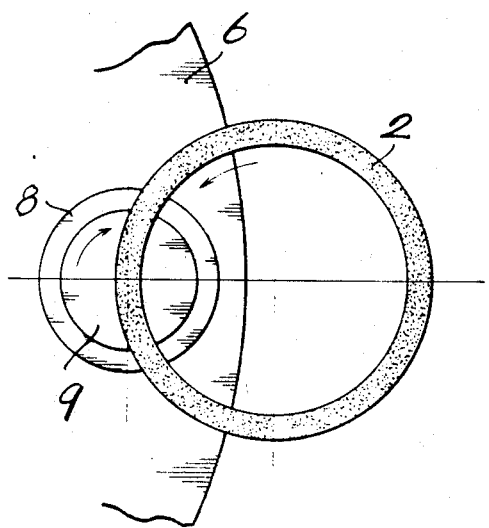
FIG. 9 is a sectional view of the face grinder shown in FIG. 7, taken along the line B—B'.
Figure 10:
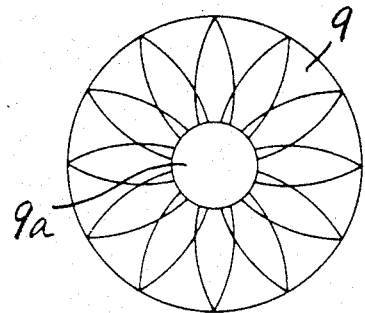
FIG. 10 and 11 shows the grinding marks of the end surfaces of workpieces.
Figure 11:
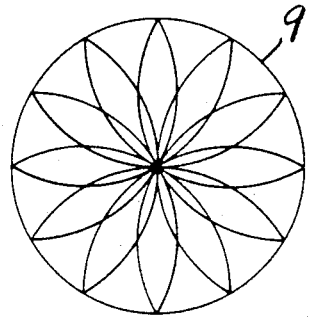
Figure 12:
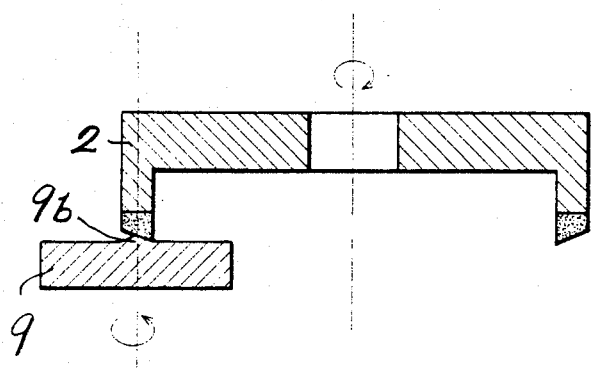
FIG. 12 is a vertical elevational view of a wheel and a workpiece which shows the state in which the wheel has been partially worn and a protruding portion is left unground in the center of the workpiece.

Referring now to FIGS. 3 to 5, which show a second embodiment of the invention, the center O of rotation of the wheel 12 is deviated by the necessary distance X from the center O' of the wheel. The chuck 14 is connected to a motor 28 provided under an index table 27 by a shaft 29. The workpiece 10 therefore rotates only on its own axis.

This structure moves the grinding wheel 12 in such a manner that it forms the trail as shown in FIG. 5, enabling the end surface of the workpiece to be ground without the protruding center portion remaining unground, as is the case with the first embodiment.

As is described above, according to this invention, there is no protruding portion remaining unground at the center of the grinding surface of a workpiece even when a grinding wheel is partially worn. Thus high working accuracy is obtained and the life of a grinding wheel is prolonged. In particular, the prolonged life of a wheel, which dispenses with the need for a change, develops working efficiency.

What is claimed is:

1. A face grinder for elminating centrally located high spots on a work piece, comprising:
   a cup-shaped grinding wheel having a peripheral grinding edge;
   a wheel head for supporting said cup-shaped grinding wheel for vertical movement;
   a chuck for holding a workpiece in facing relationship to said wheel head;
   a chuck holder for supporting said chuck; a first drive source connected to said chuck for rotation about its own axis and around the axis of said chuck holder to cause said peripheral grinding edge to sweep across the center of said workpiece;
   a second drive source connected to said grinding wheel for rotating the same about its own axis;
   said first drive source comprising an eccentric drive source having a motor connected to said chuck by a planetary gear mechanism; and
   wherein the centers of rotation of said wheel head and said grinding wheel are eccentric to one another.

* * * * *